Figure 1:
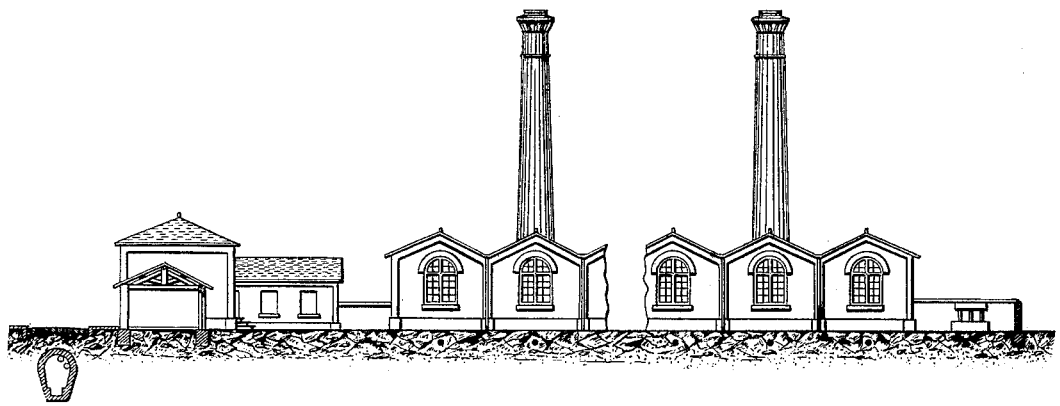

(No Model.) 6 Sheets—Sheet 1.

V. POPP.
MEANS OR APPARATUS FOR THE PRODUCTION AND DISTRIBUTION OF COMPRESSED AIR.

No. 405,971. Patented June 25, 1889.

Witnesses:
Donn Twitchell
C. Sedgwick

Inventor:
V. Popp
By Munn & Co
Attorneys.

(No Model.) 6 Sheets—Sheet 2.
V. POPP.
MEANS OR APPARATUS FOR THE PRODUCTION AND DISTRIBUTION OF COMPRESSED AIR.
No. 405,971. Patented June 25, 1889.
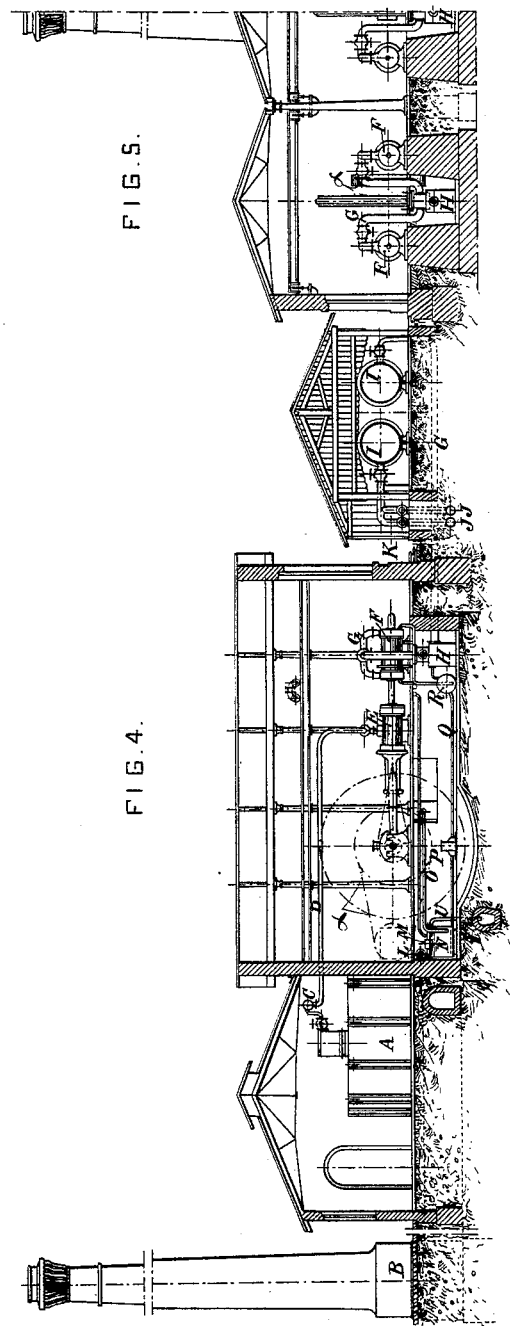
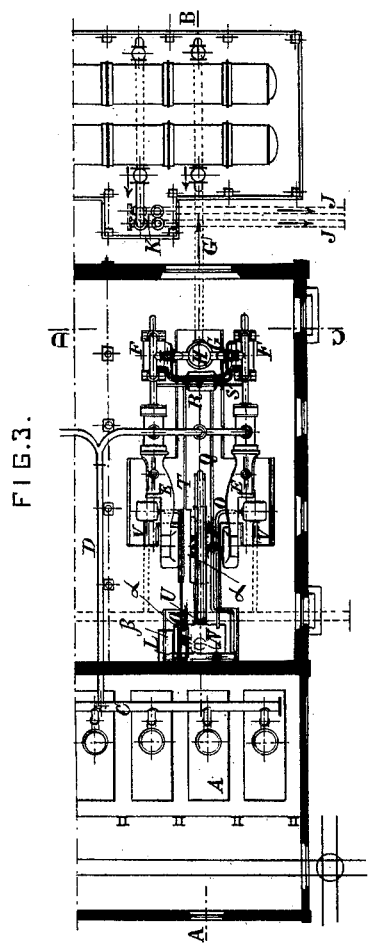
Witnesses:
Donn Twitchell
C. Sedgwick
Inventor.
V. Popp
By Munn & Co
Attorneys

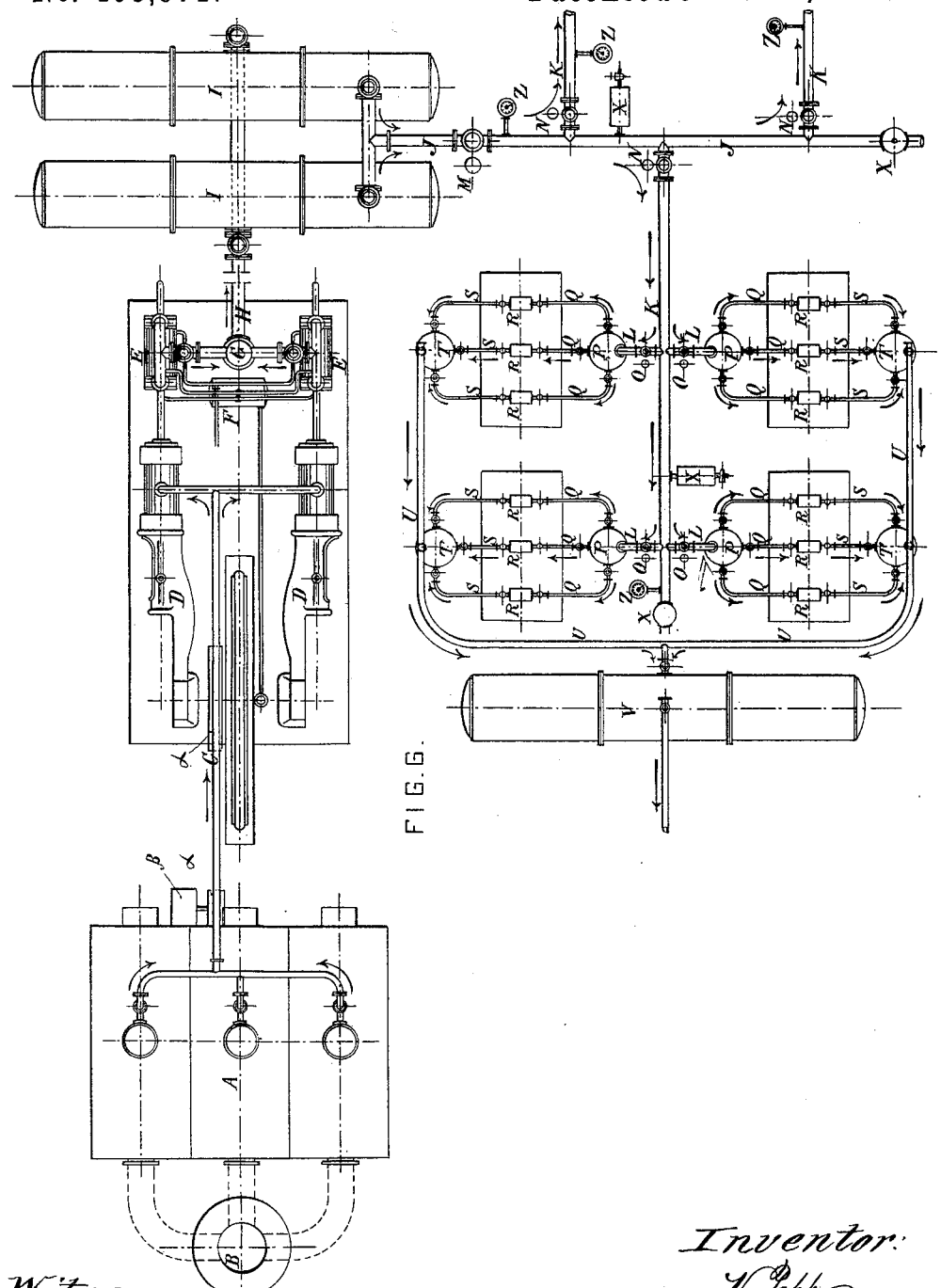

(No Model.) 6 Sheets—Sheet 4.
V. POPP.
MEANS OR APPARATUS FOR THE PRODUCTION AND DISTRIBUTION OF COMPRESSED AIR.
No. 405,971. Patented June 25, 1889.
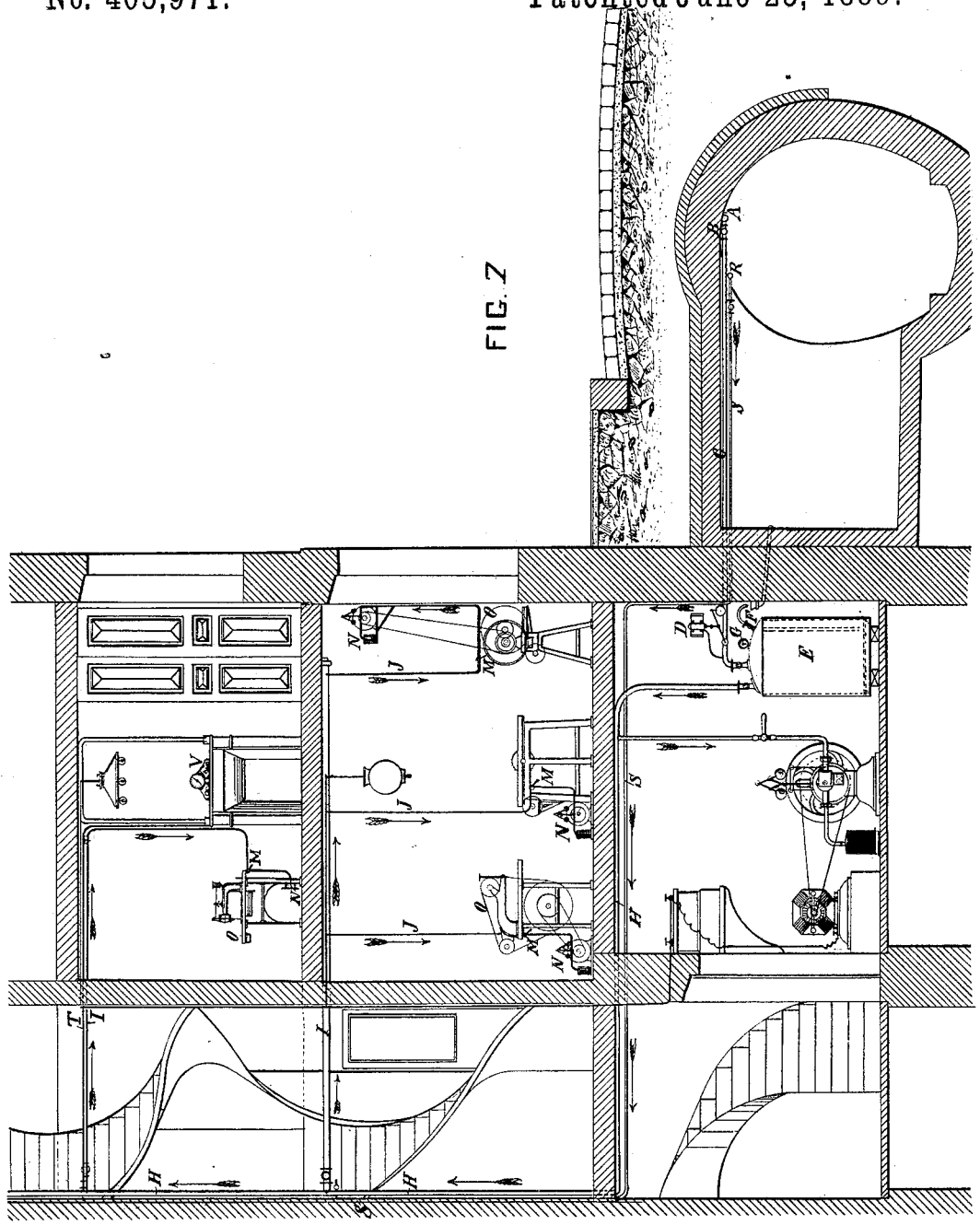
Witnesses:
Donn Twitchell
C. Sedgwick
Inventor:
V. Popp
By Munn & Co.
Attorneys (No Model.)  V. POPP.  6 Sheets—Sheet 5.
MEANS OR APPARATUS FOR THE PRODUCTION AND DISTRIBUTION OF COMPRESSED AIR.
No. 405,971.  Patented June 25, 1889.
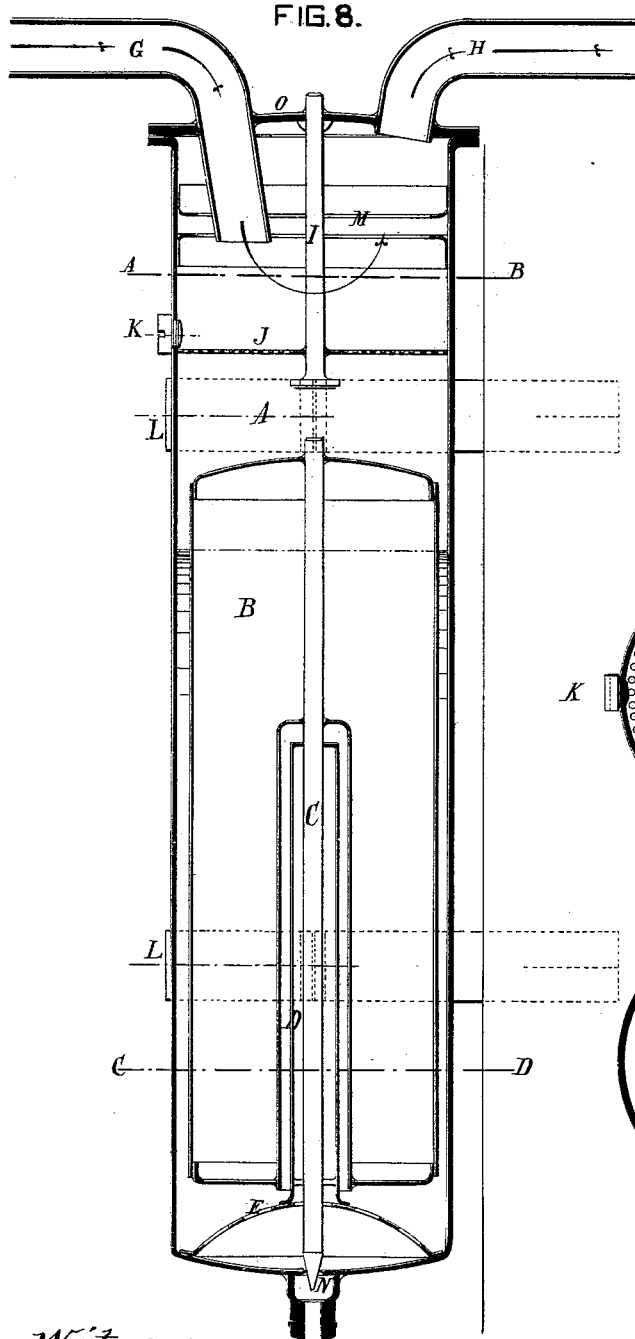
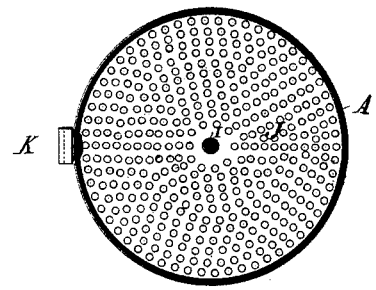
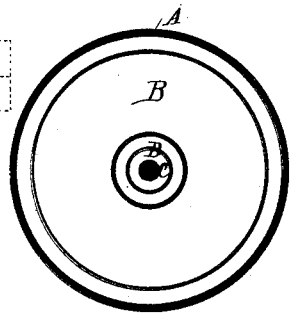
Witnesses:
Dom Twitchell
C. Sedgwick
Inventor:
V. Popp
By Munn & Co.
Attorneys.
N. PETERS, Photo-Lithographer, Washington, D. C.

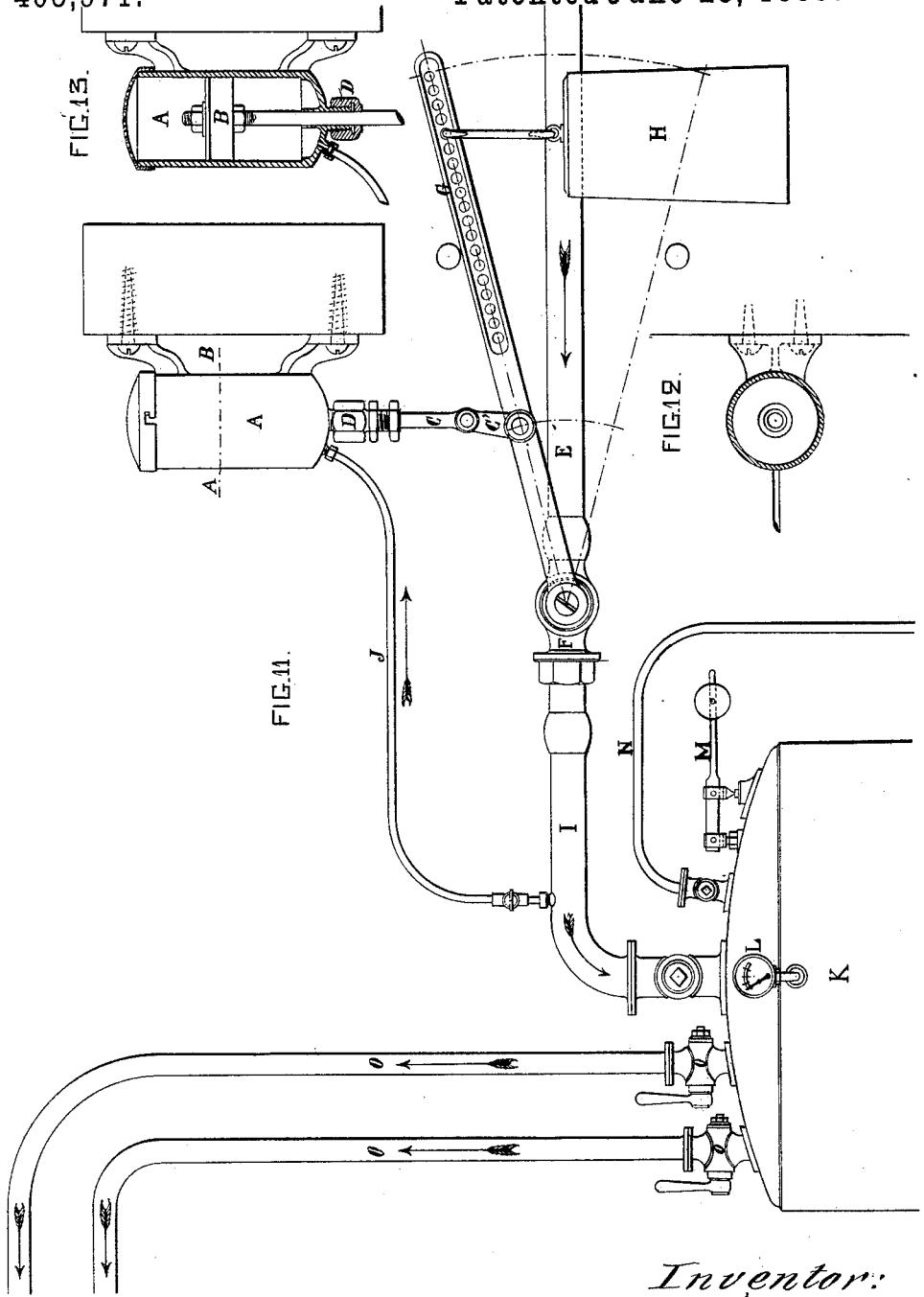

UNITED STATES PATENT OFFICE.

VICTOR POPP, OF PARIS, FRANCE, ASSIGNOR TO THE POPP COMPRESSED AIR AND ELECTRIC POWER COMPANY, (LIMITED.)

MEANS OR APPARATUS FOR THE PRODUCTION AND DISTRIBUTION OF COMPRESSED AIR.

SPECIFICATION forming part of Letters Patent No. 405,971, dated June 25, 1889.

Application filed September 29, 1886. Serial No. 214,846. (No model.) Patented in France November 27, 1885, No. 172,574, and in England December 15, 1885, No. 15,420.

*To all whom it may concern:*

Be it known that I, VICTOR POPP, of the city of Paris, France, have invented new and useful Improvements in Means or Apparatus for the Production and Distribution of Compressed Air, (for which I have obtained patents in the following countries, to wit: In France, patent of fifteen years, dated November 27, 1885, No. 172,574, and in England, patent of fourteen years, dated December 15, 1885, No. 15,420,) of which the following is a full, clear, and exact description.

The object of my invention is to provide a general system of compressed-air distribution, by means of which compressed air may be delivered at any point throughout the streets of a town or in any district in such a manner that it can be utilized for any one of the many purposes to which this agent is applicable. Thus, by my system it is possible to deliver compressed air at any house in the district covered by the system to be utilized for motive power, for ventilation, for refrigerating, for clocks, or for any other of the many purposes to which compressed air may be applied. It has been heretofore proposed that compressed air be distributed in this manner by a system having a uniform pressure throughout, such as is employed in the ordinary distribution of gas. This proposition has, however, been found impracticable for many reasons, the chief ones being: First, the great cost of the pipes necessary; second, the impossibility of determining beforehand the local character and demands of the service and the size of pipe necessary at each point; and, third, the inadaptability of such an arrangement for motive-power purposes where pressure of the air acts directly to perform work, and the impossibility of adapting it to the fluctuations consequent upon the great variation in the character and demands of the work.

My system has been found by experience to obviate all of the difficulties inherent in all previously-suggested systems, rendering to each consumer entirely independent of all others, and giving him an invariable supply of air adapted to the character of the work he has for it to perform.

My system includes: First, a compressing station; second, a primary system of pipes leading therefrom, which are provided with automatic regulators for maintaining therein a pressure greater than that at which the air is to be generally utilized; and, third, a secondary system of branch pipes leading to the consumer's stations, each provided with an automatic-pressure regulator and reducer, adjustable to the character of the consumer's service. It consists, moreover, in an arrangement by which the air from the stations using a high pressure may be gathered into a system of pipes, from which it may be again utilized in stations using a lower pressure. There are, moreover, shown a number of details of construction, to which claim will be hereinafter made.

In the accompanying drawings there are shown in detail a compressing-station and all the essential features of an installation capable of compressing and distributing fifty thousand cubic meters of air per hour.

Figure 2:
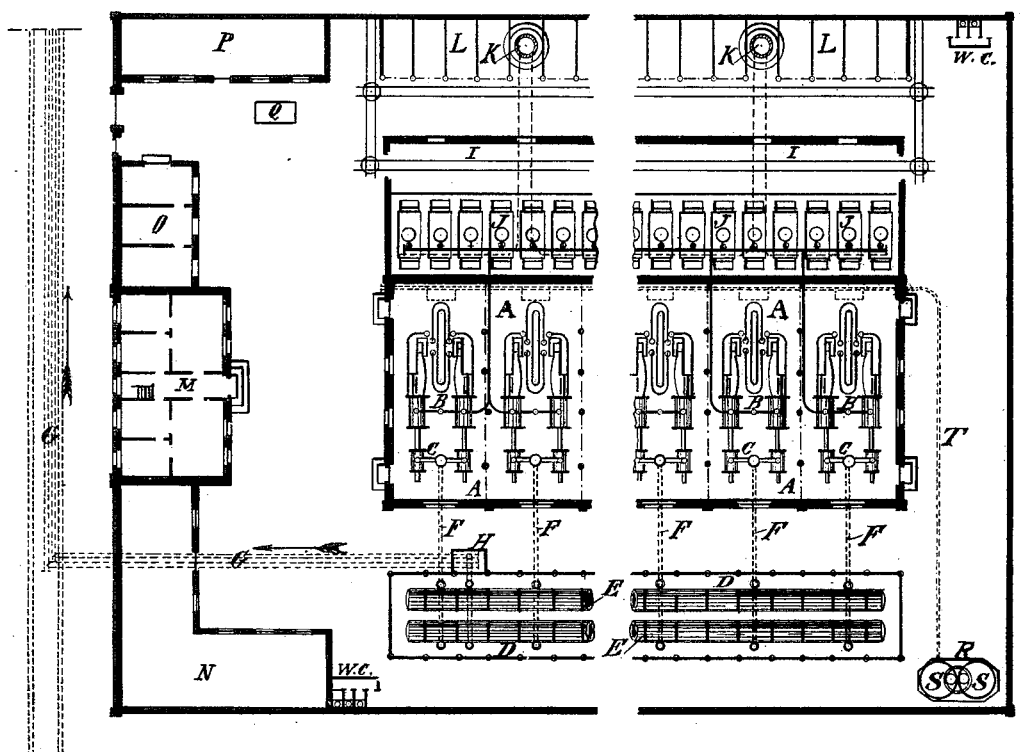

In the drawings, Figure 1 is an elevation of a condensing-station; Fig. 2, a plan thereof; Fig. 3, a plan, on a larger scale, of a single compressor. Figs. 4 and 5 are sections of a compressor with boiler and reservoir. Fig. 6 is a diagram of a compressor and my general distributing system. Fig. 7 is a section of a consumer's station, showing the different ways in which the air may be utilized. Fig. 8 is a vertical transverse section with an automatic siphon. Fig. 9 is a section on the line A B of Fig. 8. Fig. 10 is a section of the same on the line C D. Fig. 11 illustrates an automatic pressure-regulator and a local reservoir. Fig. 12 is a section of the cylinder in Fig. 11 on the line A B, and Fig. 13 is a vertical section of the same cylinder.

In Figs. 1 and 2 A is the building, containing the steam-engine and the compressors. B B are the engines. C C are compressors; D, the reservoir-house, and E E the reservoirs therein; F F, pipes from the compressors to the reservoirs; G, the main conduit of distribution; H, the pressure-regulator; I, the boiler-house; J J, the boilers; K K, the chimneys; L, the coal-store; M, the office; N, the machine-shop; O, the lodge; P, the store; Q, a weigh-bridge; R, the building inclosing the well and pumps; S, the water-tank, and T the water-main.

In Figs. 3, 4, and 5, wherein the same letters refer to the same parts, A A are the boilers; B, the chimney; C, steam-pipe; D, a secondary steam-pipe; E E, the engines; F F, compressors; G, compressed-air pipe; H, the air-drying apparatus; L, the water-main; M, a ball-cock; N, the condensing-water tank; O, the injection-pipe; P, injection-pump for the compressors; Q, pipes from the pump; R, tank for injection-water; S, pipe for circulation of water in the jacket of the compressor; F F, outlet-pipes, and U overflow-pipe. The station which is thus illustrated involves only well-known features in the construction of air-compressing stations. The air compressed by the apparatus described passes into the reservoirs I I, and thence into the main conduits J J through automatic-pressure regulating and reducing apparatus K, which is of a construction to be hereinafter described with reference to Figs. 11, 12, and 13. By this means, as the air in the reservoirs I I is at a higher pressure than that in the pipes J J, the pressure in the pipes will be maintained constant.

Referring now to Fig. 6, which is independently lettered, my general system of distribution will be described. In this figure J represents the main distribution-conduit, wherein is maintained, as has just been described, a constant pressure of compressed air. This pressure is higher than that at which the air is to be generally utilized. K K represent a secondary system of service-pipes, each connected with the primary pipe K by means of the regulator and reducer N, such as will be hereinafter described. It is the function of the regulator to bring the air-pressure to a point suitable for the purposes to which it is to be applied, and also to insure a constancy of pressure in each locality, notwithstanding the frequent, sudden, great, and unforeseen fluctuations to which a general system, supplying air for all purposes, is liable. Thus, for example, for motive power the most suitable pressure is three kilograms per square centimeter; for raising liquids it should not exceed two kilograms; for ventilation one kilogram, and for blowing, lighting, medical purposes, &c., thirty to forty centimeters of water. By means of the regulators the air may be brought down to any one of these standard pressures, while the fluctuations due to the varied demands of the various kinds of work and the various sizes of supply-pipes which have been laid with the first installation, are constantly provided against by the same apparatus. There are also shown in Fig. 6 a number of stations connected with one of the secondary pipes K. In this case it may be also necessary to provide local regulators O in addition to the regulator M. In this case I have also provided for the exhaust-air from the various stations, it being collected into a secondary system for utilization at points where a lower pressure of air is required. In this arrangement L L are branch pipes leading from pipe K into each station. P is a local reservoir. Q Q are pipes to individual machines R. S S are pipes leading from the exhaust of the machines to a reservoir T. U is a pipe connecting the several stations and leading to a large reservoir V, from which the air may be distributed at a lower pressure. Z Z are pressure-gages, and X X are automatic siphons for carrying off the condensed moisture. This siphon is shown in detail in Figs. 8, 9, and 10.

Fig. 7 exhibits in detail the installation of compressed air for various purposes in the different parts of a building. In this figure, which is independently lettered, A is the principal conduit leading through the sewer; C, a branch therefrom with an intermediate stop-cock B. D is a pressure-regulator; E, the local reservoir provided with a pressure-gage G, and also serving as a siphon by being provided with a pipe F, leading from a point near the bottom upward through the top to a cock or faucet draining into the sewer. The moisture which is collected at the bottom of the reservoir will be forced by air-pressure up through this pipe F and out into the sewer. H is a vertical service-pipe in a staircase, and I I are branches therefrom to each floor. J J are distributing-pipes to the motors N. M M are the regulating-valves. O O are machines operated by the motors. R represents a conduit for the service of pneumatic clocks, and S and T are pipes leading therefrom to a pneumatic clock V.

For carrying off the moisture which is always to be found in compressed air, I provide an automatic siphon, represented in Figs. 8, 9, and 10, which are independently lettered. In these figures A is a cylinder of wrought or cast iron. B is a float carrying a rod C, the lower end of which forms a plug-valve for the opening N at the bottom of the cylinder. In the upper head of the cylinder are fixed the inlet-pipe G and outlet-pipe H. The former extends a short distance down into the cylinder through the screen or strainer of textile material M, which retains the impurities contained in the air. These impurities are deposited upon a perforated plate J, which may be cleaned from time to time through an opening K in the cylinder. The screen M passes across the course of the air, which is obliged to pass through it in going from pipe G to pipe H. The float B is formed of light material, and when sufficient water has accumulated around it to render it buoyant it rises, lifting with it the valve C. The water then escapes until the float again settles down and closes the valve.

The automatic pressure-regulator, which has been mentioned above, is shown in Figs. 11, 12, and 13, these figures being independently lettered. In these figures E is an inlet-pipe and F a cock therein, by turning which the size of the orifice between the pipes E and I may be regulated. A is a cylinder in which moves a piston B, connected to a lever-arm G on cock F through the rod C and link C'. The lower side of piston B is exposed to the pressure in pipe I through the small pipe J. The counter-weight H offers a resistance to the vertical movement of the piston, and it follows that there is at a given moment and according to the position of the counter-weight an equilibrium between the two forces. The cock F then remains sufficiently open to allow the necessary quantity of air to enter pipe I, according to the demands on the system. The pressure can be adjusted by varying the position of the weight H. L is a pressure-gage on local reservoir K. N is the drainage-pipe, and O O are supply-pipes leading to the apparatus to be worked.

What I claim as new, and desire to secure by Letters Patent, is—

1. In a system of compressed-air distribution, the combination, with a central compressor, of a conduit and branches leading therefrom, an automatic pressure-regulator maintaining in said conduit a pressure greater than that at which the air is to be utilized, and two or more utilizing-stations connected with said conduit and each provided with distinctively-adjusted pressure-reducing apparatus, substantially as described.

2. In a system of compressed-air distribution, the combination, with a compressor at the distributing-station, of a main conduit, connected therewith and extending throughout the district to be supplied, a regulator maintaining a constant pressure in said conduit, a series of branch conduits adapted for a lower pressure, each leading from the main through an automatic pressure-reducer and air-utilizing apparatus at consumers' stations connected to each of said branches, whereby the varying local demands of the system may be automatically supplied.

3. In a system of compressed-air distribution, the combination, with a compressor at the distributing-station, of a main conduit connected therewith and extending throughout the district to be supplied, a regulator maintaining a constant pressure in said conduit, a series of branch conduits adapted to a lower pressure, each leading from the main through an automatic pressure-reducer, and utilizing apparatus at the consuming-station connected to each branch conduit and automatic pressure-regulator at each station, whereby the varying demand of any locality may be supplied and the apparatus adjusted at each consumer's station.

4. In a system of compressed-air distribution, the combination, with a main compressor, of main and branch pipes leading therefrom and two or more consumers' stations, each provided with a local reservoir, and an automatic pressure-regulator placed at an intermediate point between the reservoir and the supply-pipe.

5. In a system of compressed-air distribution, the combination, with the main-supply compressor, of main and branch conduits, two or more consumers' stations with apparatus for utilizing air-pressure, a pipe connecting said stations and leading to a reservoir, a connection between said pipe and the exhaust of the said apparatus at the stations, and secondary apparatus connected with the said reservoir for utilizing the reduced air-pressure.

6. In a system of compressed-air distribution, the combination, with conduit conducting the air, of a strainer extended transversely across the conduit, the conduit being provided with an opening in front of the strainer for removing the accumulation of dirt.

7. In a system of compressed-air distribution, the combination of the screen M, Fig. 8, the pipe G, with a downward opening, and the outlet-pipe A, leading from the opposite side of the screen.

8. The combination, with the reservoir A, Fig. 8, placed at the lowest point of a distribution-pipe for collecting the moisture from the fluid in the pipes, of a screen M in its upper part extending across the circuit of the fluid.

9. The combination, with moisture-reservoir A, placed in a distribution system of compressed air at a low point, so as to receive the drainage by gravity, of screen M and inlet and outlet pipes G and H, with their openings upon opposite sides of screen M, respectively.

10. A moisture-reservoir for a system of compressed-air distribution, having a screen above the water extending across the circuit of the air and a perforated partition below the said screen for catching the dirt therefrom, while allowing the moisture to pass through an opening being made above the said partition for removing the accumulation.

The foregoing specification of my improvements in means or apparatus for the production and distribution of compressed air signed by me this 10th day of September, 1886.

VICTOR POPP.

Witnesses:
ROBT. M. HOOPER,
ALBERT MOREAUX.